United States Patent [19]
Yanagimachi et al.

[11] Patent Number: 5,696,758
[45] Date of Patent: Dec. 9, 1997

[54] OPTICAL RECORDING MEDIA

[75] Inventors: Masatoshi Yanagimachi, Funabashi; Sumio Hirose, Yokohama; Yoshiteru Taniguchi, Yokohama; Hideki Umehara, Yokohama, all of Japan

[73] Assignee: Mitsui Toatsu Chemicals, Inc., Tokyo, Japan

[21] Appl. No.: 696,463

[22] Filed: Aug. 14, 1996

[30] Foreign Application Priority Data

Aug. 23, 1995 [JP] Japan ................................ 7-214651
Jul. 19, 1996 [JP] Japan ................................ 8-190487

[51] Int. Cl.$^6$ .................................................... G11B 3/70
[52] U.S. Cl. .................................................... 369/275.4
[58] Field of Search ................................. 369/13, 275.1, 369/275.2, 275.3, 275.4, 94

[56] References Cited

U.S. PATENT DOCUMENTS

| | | | |
|---|---|---|---|
| 5,124,067 | 6/1992 | Itoh et al. | 252/299.2 |
| 5,170,296 | 12/1992 | Fiberger | 369/116 |
| 5,204,852 | 4/1993 | Nakagawa et al. | 369/275.1 |
| 5,270,623 | 12/1993 | Ohta et al. | 318/268 |
| 5,343,454 | 8/1994 | Watanabe et al. | 369/44.32 |

FOREIGN PATENT DOCUMENTS

| | | |
|---|---|---|
| 4-146537 | 5/1992 | Japan . |
| 4-243019 | 8/1992 | Japan . |
| 5-36087 | 2/1993 | Japan . |

OTHER PUBLICATIONS

Nikkei Electronics, "Write–Once Optical Disc Satisfying the CD Standard, Recorded by Thermal Deformation at the Interface of a Substrate and a Dye Layer", No. 465, p. 107 (Jan. 2989) together with translation.

Emiko Hamada et al, Optical Data Storage 1989 Technical Digest Series, "That's CD–R", vol. 1, pp. 45–48, Jan. 1989.

Primary Examiner—Nabil Hindi
Attorney, Agent, or Firm—Burns, Doane, Swecker & Mathis

[57] ABSTRACT

Provided is an optical recording medium in which per-pits in a ROM area have a depth of 250 nm or more and 350 nm or less; pre-grooves between the pre-pits have a depth of 30 nm or more and 170 nm or less; wobbling tracks have an amplitude of 25 nm or more and 110 nm or less; the product of the depth of the pre-grooves between the pits and the wobble amplitude of the track is 3100 or more; and pre-grooves in a RAM area have a depth of 130 nm or more and 250 nm or less. The optical recording medium is a hybrid disk having such good signal characteristics as satisfying the Orange Book standards.

16 Claims, 1 Drawing Sheet

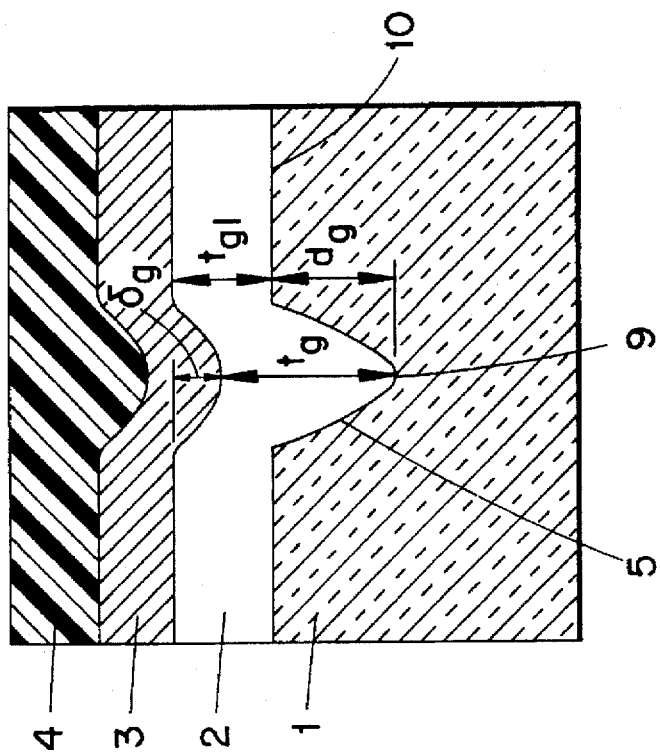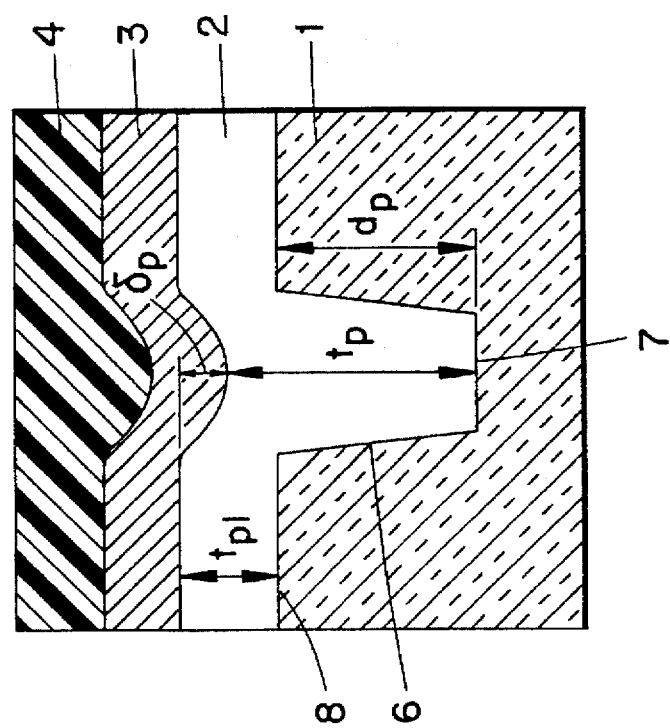

OPTICAL RECORDING MEDIA

BACKGROUND OF THE INVENTION

(1) Field of the Invention

The present invention relates to an optical recording medium capable of recording and reproducing information with laser beams, more specifically to an optical recording medium comprising a read-only (ROM) area in which pre-pits are formed on a substrate and a recordable (RAM) area in which pre-grooves are formed thereon, wherein it is possible for both areas to reproduce information with commercial CD players and CD-ROM players.

(2) Description of the Related Art

Optical media capable of recording with laser beams and reproducing recorded information with commercial CD players and CD-ROM players are proposed in, for example, Nikkei Electronics, No. 465, p. 107, Jan. 23, 1989 issue and Optical Data Storage 1989, Technical Digest Series Vol. 145 (1989). This optical recording medium comprises a recording layer containing a dye, a reflective layer, and a protective layer which are formed in this order on a substrate.

Media using cyanine dyes and phthalocyanine dyes in a recording layer are called a recordable compact disk (hereinafter abbreviated as CD-R) and commercially available in the market at present.

Irradiation of a recording layer on the CD-R with a semiconductor laser beam having a wavelength of 770 to 830 nm at a high power causes a physical or chemical change on the recording layer and allows information to be recorded thereon in the form of pits. This recording layer is irradiated with a laser beam at a low power to detect a change in the reflected beam, whereby the information can be reproduced. The above CD-R has wobbling pre-grooves, and a wobbling frequency is modulated for the time information (ATIP: Absolute Time In Pre-groove). It is recognized that in a ratio of a wobble signal level to noise level (hereinafter abbreviated as WCNRb in the case of before recording and WCNRa in the case of after recording) obtained from the wobbling pre-grooves, 36 dB or more in terms of WCNRb and 26 dB or more in terms of WCNRa are necessary. Accordingly, CD-R is designed so that these characteristics are satisfied.

On the other hand, a recording layer containing a dye is not provided in conventional CDs which are commercially available, that is, read-only CD and CD-ROM media. Information are recorded on the surface of a substrate in the form of pre-pits in molding the substrate, and a reflective layer and a protective layer are formed thereon. Information for controlling a rotating speed and a time information are obtained from the pits, and the tracks comprising the pre-pits are not provided with wobbling.

In recent years, proposed are optical recording media prepared by combining a read-only area (hereinafter abbreviated as a ROM area) having pre-pits formed in advance on a substrate as is the case with the CDs and CD-ROMs described above with a recordable area (hereinafter abbreviated as a RAM area) in which pre-grooves are formed as is the case with the CD-Rs described above (for example, U.S. Pat. No. 5,204,852 and U.S. Pat. No. 5,270,623).

Such optical recording media as described above are called "hybrid disks" in the Orange Book standards, and various characteristics in a ROM area and a RAM area are standardized in the Orange Book.

A ROM area in such hybrid disk is largely different in the following two points from the preceding commercial CD and CD-ROM media, and thus the problem is involved that the following characteristics in the ROM area are not sufficiently satisfied. That is, (1) a recording layer containing a dye is provided not only on pre-grooves in the RAM area but also on pre-pits in the ROM area; because of the presence of the dye layer, the same pre-pit forms as those of commercial CD and CD-ROM media do not provide the sufficiently satisfactory modulation; and (2) it is required in the hybrid disks that since the control of a rotating speed and the time management in recording are carried out in the same manner from the ROM area through the RAM area uninterruptedly, the tracks comprising the pre-pits in the ROM area are provided with wobbling as is the case with the RAM area and the ATIP information described above is recorded and that the standard for WCNRa in the CD-R described above is satisfied.

Thus, in the hybrid disks, the constitution in the ROM area is largely different in the points 1 and 2 described above from conventional CDs and CD-ROMs, and therefore it is difficult to secure the modulation and WCNRa in the ROM area. It is required to consider, for example, factors such as a form of tracks comprising pre-pits and a wobble amplitude in said pre-pit tracks.

Several proposals have been made on the shape and the wobble amplitude of the pre-pit tracks described above.

Ranges as much broad as 150 to 400 nm in terms of the depth and 0.2 to 1.4 µm in terms of FWHM (full width at a half maximum depth) of pre-pits for securing the modulation in the ROM area are disclosed in Japanese Patent Application Laid-Open No. Hei 4-146537. It will certainly be possible to only secure the modulation in the ROM area by controlling the film thickness of the recording layer, even if the pre-pit shape falls in the broad range described above. However, it is difficult to satisfy all of various characteristics prescribed in the Orange Book, such as servo signal characteristics and recording characteristics in a RAM area. In particular, in order to secure a radial contrast (RCb) which is a signal obtained when a beam crosses pre-grooves in a non-recorded portion, the depth of the grooves has to be relatively increased. In the case of the deep pre-grooves, it is required to apply a recording layer while controlling the thickness of the recording layer, so that the excellent recording characteristics can be maintained. In this case, it has been found by us that the sufficiently satisfactory modulation can not be obtained over the wide range described above depending on the pre-pit form in the ROM area. Further, nothing is described concerning wobbling in the pre-pit tracks in the ROM area in the publication described above.

On the other hand, in Japanese Patent Application Laid-Open No. Hei 4-243019, in order to obtain ATIP information in a ROM area, pre-pit tracks in the ROM area are provided with wobbling, and the wobble amplitude of the pre-pit tracks is increased more than the wobble amplitude of pre-grooves tracks in a RAM area, whereby a WCNRa in the ROM area is enhanced. It is disclosed therein that a difference between the wobble amplitudes of the pre-pit tracks in the ROM area and the pre-grooves tracks in the RAM area is 10 nm or more, preferably 16 to 36 nm, and the amplitude of the pre-pit tracks is 66 to 106 nm. Disclosed in an example described in the publication described above is a medium having a width of 0.6 µm and a depth of 110 nm in the pre-pits and a wobble amplitude of 43 nm in the pre-pit tracks in the ROM area, and a width of 0.6 µm and a depth of 80 nm in the pre-grooves and a wobble amplitude of 30 nm in the RAM area. It has been found by us that on the above conditions, the problem is caused that the RCb is small because of the small depth of the pre-grooves in the RAM area, and the large modulation can not be obtained because of the small depth of the pre-pits in the ROM area. Further, it has been found by us that when cyanine dyes are used for the recording layer as described in the above publication, the satisfactory value of the WCNRa can be obtained in the conditions described above, but when more preferred dyes other than the cyanine dyes, for example, phthalocyanine dyes are used in the recording layer, the sufficiently satisfactory WCNRa can not be obtained even if the wobble amplitude of the pre-pit tracks is adjusted to 106 nm.

In Japanese Patent Application Laid-Open No. Hei 5-36087, pre-grooves having a smaller depth than that of pre-pits are provided between the pre-pits in a ROM area, and a track comprising the pre-pit and the pre-groove is provided with wobbling, whereby the WCNRa is enhanced. Design is made in this publication so that controlled are the depth to 80 to 140 nm and the FWHM to 0.2 to 0.6 µm in the pre-pits and, the small depth to 30 to 100 nm and the FWHM to 0.2 to 0.6 µm in the pre-groove present between two pre-pits. However, investigations made by us show that on these conditions, the depth of the pre-pits in the ROM area is too small to obtain the good modulation as described above. Further, the depth of the pre-grooves in the RAM area is too small to obtain the satisfactory RCb.

It is a matter of course that in hybrid disks, other characteristics in both a ROM area and a RAM area in addition to such modulation and WCNRa in the ROM area as described above are required to satisfy the Orange Book standards. These various characteristics have a relation of trade-off to each other in many cases, and therefore it has been difficult to satisfy the standards on all the characteristics with the conventional techniques described above.

SUMMARY OF THE INVENTION

An object of the present invention is to provide an optical recording medium of a hybrid disk comprising a recording layer containing a dye, a reflective layer, and a protective layer each provided in this order on a substrate comprising a ROM area in which pre-pits are formed and RAM area in which pre-grooves are formed, wherein the ATIP information in the ROM area and the RAM area can be well read out, and such good recording and reproducing characteristics as satisfy the Orange Book standards are provided in both the ROM and RAM areas.

The object described above can be achieved by an optical recording medium having the following constitutions: 1. a hybrid optical recording medium comprising a recording layer containing a dye, a reflective layer, and a protective layer each provided in this order on a substrate comprising a read-only (ROM) area in which pre-pits are formed and a recordable area (RAM) in which pre-grooves are formed, wherein:

(1) the ROM area has the pre-pits and pre-grooves connecting each adjacent pre-pit, and said pre-pits and pre-grooves form wobbling tracks, wherein said pre-pits have a depth of 250 nm or more and 350 nm or less; said pre-grooves have a depth of 30 nm or more and 170 nm or less; the tracks have a wobble amplitude of 25 nm or more and 110 nm or less; and the product of the depth of the pre-grooves described above and the wobble amplitude described above is 3100 or more, and (2) the RAM area has the pre-grooves of a depth of 130 nm or more and 250 nm or less;

2. an optical recording medium as described in the item 1, wherein the dye used for the recording layer comprises a phthalocyanine dye represented by the following Formula (1):

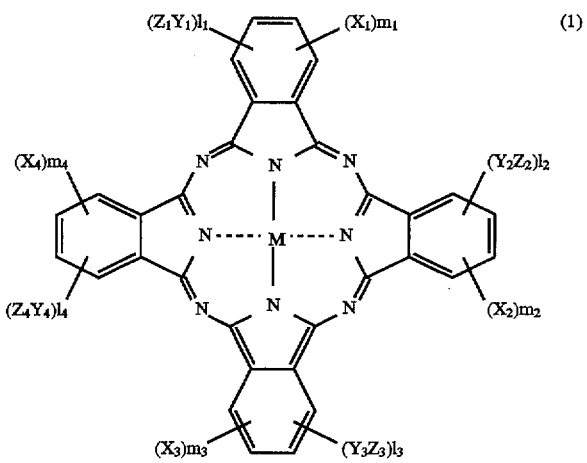

(1) wherein M represents two hydrogen atoms, or metal, metal oxide or metal halide; $Y_1$, $Y_2$, $Y_3$ and $Y_4$ each represent an oxygen atom or a sulfur atom; $Z_1$, $Z_2$, $Z_3$ and $Z_4$ each represent an unsubstituted or substituted hydrocarbon group having 4 to 12 carbon atoms; $X_1$, $X_2$, $X_3$ and $X_4$ each represent a halogen atom; $l_1$, $l_2$, $l_3$ and $l_4$ each represent 1 or 2; and $m_1$, $m_2$, $m_3$ and $m_4$ each represent an integer of 0 to 3;

3. an optical recording medium as described in the item 1 or 2, wherein the pre-pits in the ROM area have a depth of 270 nm or more and 340 nm or less; said pre-grooves have a depth of 35 nm or more and 150 nm or less; the tracks have a wobble amplitude of 28 nm or more and 99 nm or less; and the product of the depth of the pre-grooves and said wobble amplitude is 3300 or more;

4. an optical recording medium as described in any of the items 1 to 3, wherein the pre-grooves in the RAM area have a depth of 150 nm or more and 230 nm or less; and 5. an optical recording medium as described in any of the items 1 to 4, wherein a difference between optical path lengths in a pre-pit portion in the ROM area and a land between two tracks comprising the pre-pits and the pre-grooves is 0.26 λ (wherein λ is the wavelength of a laser beam for reproduction) or more and 0.40 λ or less.

The present invention makes it possible to provide an excellent hybrid disk in which a WCNRa that is a reproduced signal of wobbling in the ROM area and the RAM area is uniform and sufficiently large, and the Orange Book standards are satisfied in both the ROM are and the RAM area.

BRIEF DESCRIPTION OF THE DRAWINGS

FIG. 1 is a cross-sectional constitutional drawing showing the optical recording medium according to the present invention. (a) is a cross-sectional drawing obtained by cutting the ROM area in the radial direction, and (b) is a cross-sectional drawing obtained by cutting the RAM area in the radial direction. In the drawings, the respective numerals represent the following; 1: substrate, 2: recording layer, 3: reflective layer, 4: protective layer, 5: pre-groove, 6: pre-pit, 7: pre-pit bottom, 8: land between adjacent tracks, 9: pre-groove bottom, 10: land between two adjacent pre-grooves, $d_p$: depth of the pre-pit, $t_p$: thickness of a dye layer on the pre-pit bottom, $t_{pl}$: thickness of a dye layer on the land between two adjacent pre-pit tracks, $\delta_p$: depth of the pre-pit in an interface between the reflective layer 3 and the dye layer 2, $d_g$: depth of the pre-groove, $t_g$: thickness of a dye layer on the pre-groove bottom, $t_{gl}$: thickness of a dye layer on the land between two pre-grooves, and $\delta_g$: depth of the pre-groove in an interface between the reflective layer 3 and the dye layer 2.

DETAILED DESCRIPTION OF THE PREFERRED EMBODIMENT

The optical recording medium of the present invention has a constitution in which a recording layer containing a dye, a reflective layer and a protective layer are formed in this order on a substrate provided thereon with a ROM area and RAM area. The ROM area has the pre-pits and pre-grooves connecting each adjacent pre-pit, and said pre-pits and pre-grooves form wobbling tracks. The RAM area has pre-grooves forming wobbling tracks. The pre-pits and the pre-grooves between each adjacent pre-pit in the ROM area and the pre-grooves in the RAM area have the following specified shapes.

With respect to the shape of the pre-grooves in the RAM area, the depth is preferably 130 nm or more and 250 nm or less. If the depth of the pre-grooves present in the RAM area is less than 130 nm, the RCb becomes smaller to make tracking servo control difficult. On the other hand, if the depth of the pre-grooves is larger than 250 nm, the reflectance is lowered while the RCb becomes larger, and therefore recorded signals can not be well reproduced. In view of the RCb and the reflectance, the depth of the pre-grooves is preferably 150 nm or more and 230 nm or less, more preferably 170 nm or more and 200 nm or less. FWHM (full width at a half maximum depth) of the pre-grooves falls in a level of 0.3 to 0.6 μm. Said pre-grooves wobble, and the wobble amplitude is preferably 25 nm or more and 36 nm or less. If the wobble amplitude is less than 25 nm, the wobble signal (WCNRb) before recording becomes small, and the ATIP information can not be well reproduced, or in the worst case recording is impossible. Meanwhile, if said wobble amplitude exceeds 36 nm, the WCNRb becomes larger to make tracking servo control difficult in commercial CD-R recorders, or in the worst case recording is sometimes impossible. Further, the jitter in the recorded signals is increased, and error rates are unfavorably increased.

With respect to the shape of the pre-pits present in the ROM area, the depth is preferably 250 nm or more and 350 nm or less, more preferably 270 nm or more and 340 nm or less. FWHM thereof is preferably 0.4 μm or more and 0.6 μm or less. If the width of the pre-pits is less than 0.4 μm or the depth thereof is less than 250 nm, the modulation is small, and the error rate is increased. Accordingly, signals can not be reproduced in some cases. When the depth exceeds 350 nm, the modulation tends to be increased, but the replication property of pre-pits in molding a substrate is deteriorated.

In the present invention, the ROM area has the pre-pits and pre-grooves connecting each adjacent pre-pit, and said pre-pits and pre-grooves form wobbling tracks. With respect to the shape of the pre-grooves, the depth is preferably 30 nm or more and 170 nm or less, more preferably 35 nm or more and 150 nm or less, and the FWHM is preferably 0.1 μm or more and 0.4 μm or less. If the depth is less than 30 nm, the WCNRa is unpreferably decreased, and if the depth exceeds 170 nm, the reflectance and the modulation are unpreferably decreased. The pre-pit tracks described above wobble. The wobble amplitude thereof is preferably 25 nm or more and 110 nm or less, and the product D×A of the depth (D) of the pre-grooves formed on the tracks comprising the pre-pits and the wobble amplitude (A) of the pre-pits is preferably 3100 or more. The wobble amplitude is more preferably 28 nm to 99 nm, and the product D×A is more preferably 3300 or more. If the wobble amplitude is less than 25 nm and the product D×A described above is less than 3100, the WCNRa is not increased, and the ATIP information can not be well read. Meanwhile, if the wobble amplitude exceeds 110 nm, the jitter in reproduction is deteriorated, and reproduction errors are generated.

In the present invention, the cross-sectional shape of the pre-pits described above is preferably approximately trapezoidal. This is because the pre-pits are deeper than the pre-grooves as described previously, so that it is possible to set the depth of the pre-pits with a thickness of a photoresist film, which facilitates stamper production. On the other hand, the cross-sectional shapes of the pre-grooves present in the ROM area and the RAM area are preferably approximately V shapes in view of the stamper production.

A stamper is produced preferably in the following manner. That is, a photoresist film is formed on a glass substrate in a thickness corresponding to the depth of the pre-pits. The pre-pits or pre-grooves are cut by exposing this photoresist film with a laser beam. In cutting the pre-pits, the photoresist film is exposed at a strong laser power so that the photoresist film is irradiated in the whole thickness direction thereof, and in cutting the pre-grooves between two pits, the photoresist film is exposed at a weak laser power so that a laser beam intensity is attenuated in the middle of a thickness direction of the photoresist film. On the other hand, in cutting the pre-grooves, the photoresist film is exposed at a weak laser power so that a laser beam intensity is attenuated in the middle of a thickness direction of the photoresist film corresponding to the depth of the pre-grooves. In this case, the laser beam is wobbled in the respective amplitudes both in the ROM area and the RAM area. Development after exposure causes the glass substrate face in the pre-pits portion to expose and makes the cross-sectional shape approximately trapezoidal. With respect to the pre-grooves portion, development does not proceed to the glass substrate face, and the cross-sectional shape corresponding to the intensity distribution of a laser beam is approximately a V-shape. A method of cutting for such stamper has already been technically established and easily employed.

Materials for the substrate used in the present invention may be any ones as long as they are transparent to recording and reproduction beams and have a small optical anisotropy. Used are, for example, high molecular materials such as polycarbonate resins, vinyl chloride resins, acrylic resins including polymethyl methacrylate, amorphous polyolefin resins and polyester resins, and inorganic materials such as glass. Polycarbonate resins, acrylic resins and amorphous polyolefin resins are the most suited in view of the transparency and the facility in molding a substrate.

In the present invention, the recording layer containing a dye is formed on the substrate. The thickness of the recording layer falls usually in a level of 30 to 300 nm. The thickness of the recording layer is very important in terms of various characteristics. The film thickness of the recording layer present in the ROM area is varied at a pre-pit portion, a land present between two pre-pit tracks (a land portion in the ROM area) and a land present between two pre-grooves in the RAM area (a land portion in the RAM area).

In the present invention, the modulation at the pre-pit portion in the ROM area depends not only on the shape of the pre-pit tracks but also on the thicknesses of the recording layer present at the pre-pit portion and the land portion. The explanation for this shall be given in detail with reference to FIG. 1. FIG. 1 represents the cross-sectional drawings obtained by cutting the ROM area (a) and the RAM area (b) of the medium in the radial direction, respectively.

In FIG. 1, formed are a pre-pit 6 and a land portion 8 in the ROM area, and a pre-groove 5 and a land portion 10 in the RAM area on the substrate 1. As will be described later, the recording layer 2 is formed by spin coating of a dye solution and then drying. In the case of the spin coating, the film thickness $t_p$ of the recording layer 2 at the pit bottom 7 of the pre-pit 6 is sufficiently larger than the film thickness $t_{pl}$ of the recording layer 2 in the land portion 8 of the substrate 1. When the depth of the pre-pit is $d_p$, $\delta_p$ which is the depth of the pre-pit at an interface between the reflective layer 3 and the recording layer 2 is represented by the following equation (1):

$$\delta_p = d_p + t_{pl} - t_p \qquad (1)$$

A difference ($L_p$) between optical path lengths at the pre-pit bottom 7 and the land potion 8 is represented by the following equation (2):

$$\begin{aligned} L_p &= n_s d_p + n_d(t_{p1} - t_p) \\ &= n_s d_p + n_d(\delta_p - d_p) \end{aligned} \qquad (2)$$

wherein $n_s$ is a real part of complex refractive index of the substrate 1, and $n_d$ is a real part of complex refraction index of the recording layer (dye layer) 2. When a reflective layer is formed directly on the pre-pit as is the case with commercial CD and CD-ROM, the modulation is maximized when the difference ($L_p$) between two optical path lengths at the pit portion and the land potion is $\lambda/4$. Even when a dye layer is formed also in the pre-pit portion as is the case with the present invention, the modulation is maximized in the vicinity of $\lambda/4$ in the difference ($L_p$) between the optical path lengths if the depth of the pre-pit is small. When the depth of the pre-pit is large as is the case with the present invention, a beam is scattered due to a cavity present on the surface of the dye layer, and therefore $L_p$ which gives the maximum modulation deviates from the vicinity of $\lambda/4$. In the present invention, $L_p$ at the pre-pit portion and the land portion is preferably 0.26 $\lambda$ or more (wherein $\lambda$ is the wavelength of a laser beam for reproduction) and 0.40 $\lambda$ or less.

The dyes used for the recording layer in the present invention include known cyanine dyes, phthalocyanine dyes and azo dyes all of which are used for CD-R. A phthalocyanine dye represented by Formula (1) is preferred from the viewpoint of the recording characteristics and the durability:

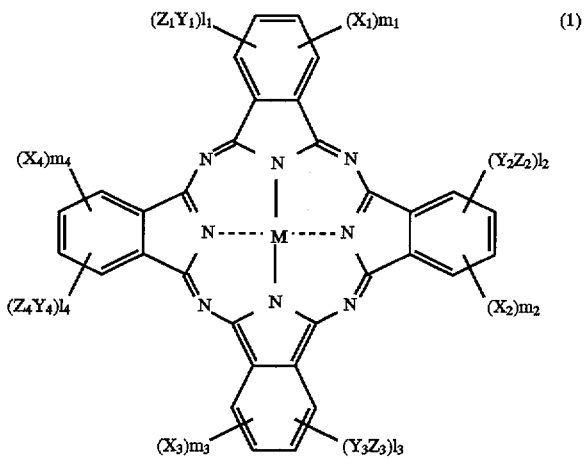

wherein M represents two hydrogen atoms, or metal, metal oxide or metal halide; $Y_1$, $Y_2$, $Y_3$ and $Y_4$ each represent an oxygen atom or a sulfur atom; $Z_1$, $Z_2$, $Z_3$ and $Z_4$ each represent an unsubstituted or substituted hydrocarbon group having 4 to 12 carbon atoms; $X_1$, $X_2$, $X_3$ and $X_4$ each represent a halogen atom; $l_1$, $l_2$, $l_3$ and $l_4$ each represent 1 or 2; and $m_1$, $m_2$, $m_3$ and $m_4$ each represent an integer of 0 to 3.

The examples of M in the phthalocyanine dye represented by Formula (1) include divalent metals such as Cu, Fe, Co, Pd, Ru, Pt, Ti, Be, Ca, Ba, Ni, Mg, Zn, Pb and Cd, metal oxides such as VO, and metal halides such as AlCl, AlBr, GaCl, InBr, TiCl, and TiBr. On the other hand, $Z_1$, $Z_2$, $Z_3$ and $Z_4$ each represent an unsubstituted or substituted hydrocarbon group having 4 to 12 carbon atoms. The examples thereof include saturated hydrocarbon groups such as butyl, pentyl, hexyl, heptyl, octyl, nonyl, decyl, dodecyl, cyclohexyl and dimethylcyclohexyl, and unsaturated hydrocarbon groups such as butenyl, hexenyl, octenyl, dodecenyl, phenyl, methylphenyl, butylphenyl and hexylphenyl. These hydrocarbon groups may be either linear or branched. Further, these hydrocarbon groups may be substituted with halogen, an amino group, and an ether group. Even if substituted with an amino group and an ether group, the total carbon atoms contained in the substituents are 4 to 12. Halogen represented by $X_1$, $X_2$, $X_3$ and $X_4$ include fluorine, chlorine, bromine and iodine.

The substitution positions of the preceding substituents $X_1$ to $X_4$ and the substituents $Y_1$ to $Y_4$ each bonded to the benzene rings constituting phthalocyanine are not specifically restricted. The kind and the number of the substituents may be same or different in the four benzene rings contained in a molecule.

Among the phthalocyanine dyes represented by Formula (1) described above, a phthalocyanine dye in which the substitution positions of $Y_1$, $Y_2$, $Y_3$ and $Y_4$ are the $\alpha$ position in the benzene rings, and $l_1$, $l_2$, $l_3$ and $l_4$ are 1 is preferred from the viewpoint of the reflectance and the recording characteristics.

The examples of the preferred phthalocyanine dye include the dyes represented by the following Formulas (2) to (10). More specifically, the dyes described in U.S. Pat. No. 5,124,067 are given and can be synthesized by the processes described therein. That is, they can be synthesized by reacting phthalodinitriles or diaminodiisoindolines having corresponding substituents with corresponding metal derivatives in a solvent having a high boiling point such as alcohol, chloronaphthalene, bromonaphthalene and trichlorobezene in the presence of 1,8-diazabicyclo[5,4,0]-7-undecene (DBU) under heating.

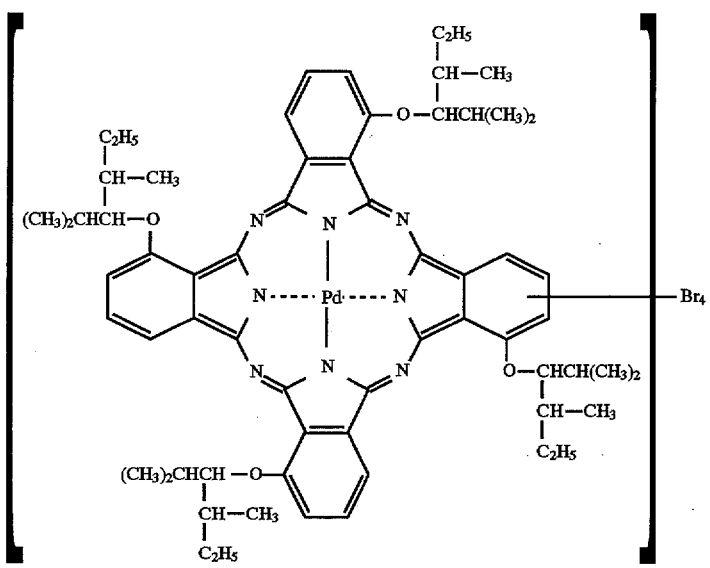
(2)
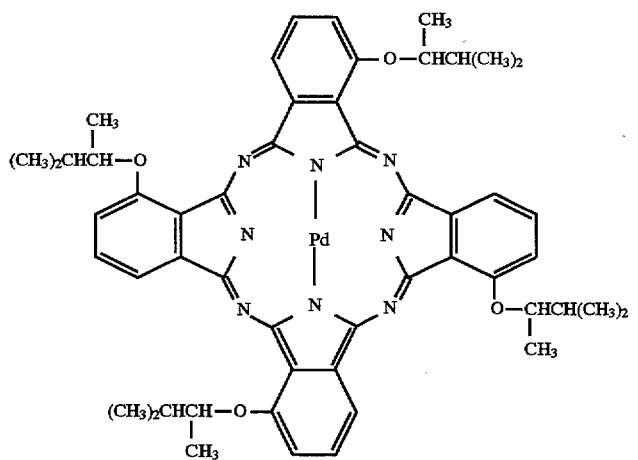
(3)
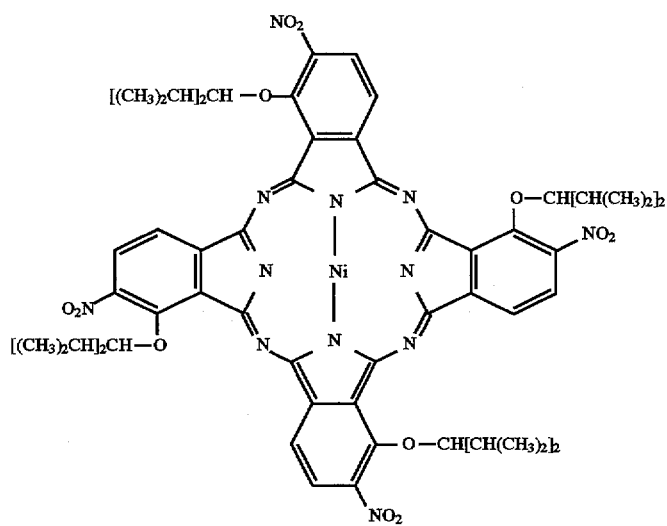
(4)

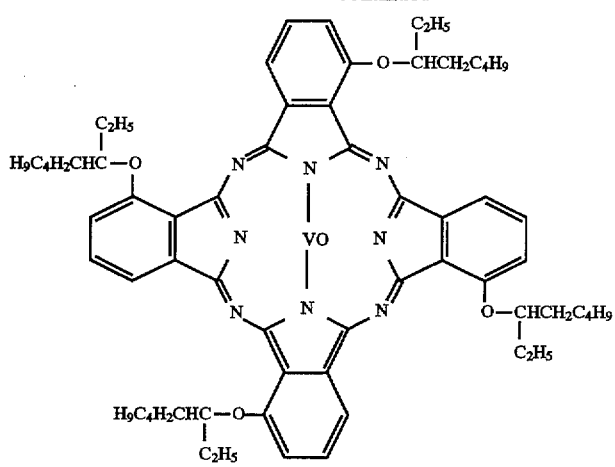
(5)
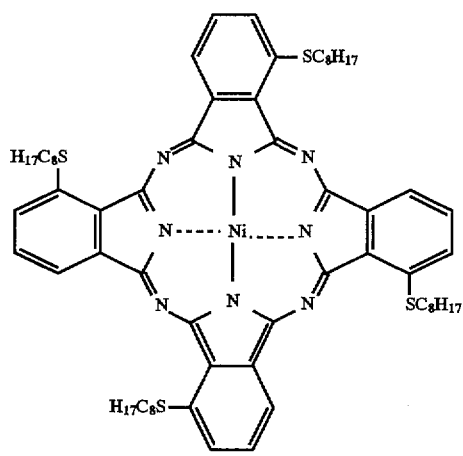
(6)
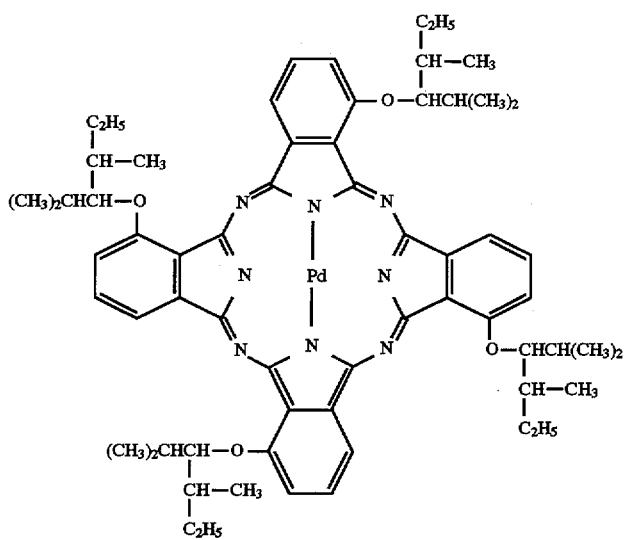
(7)

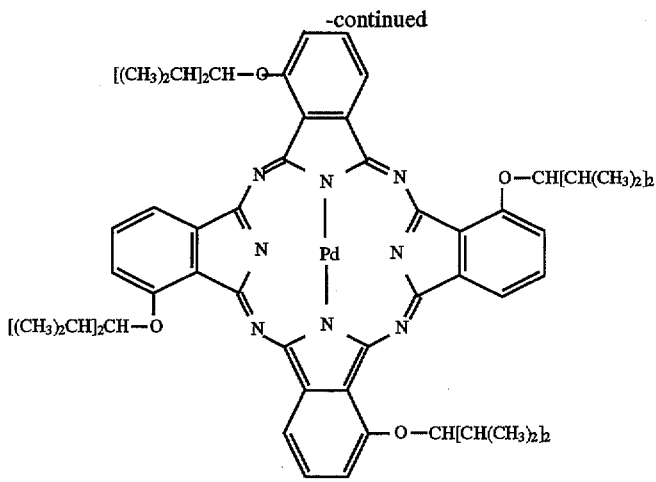

(8)

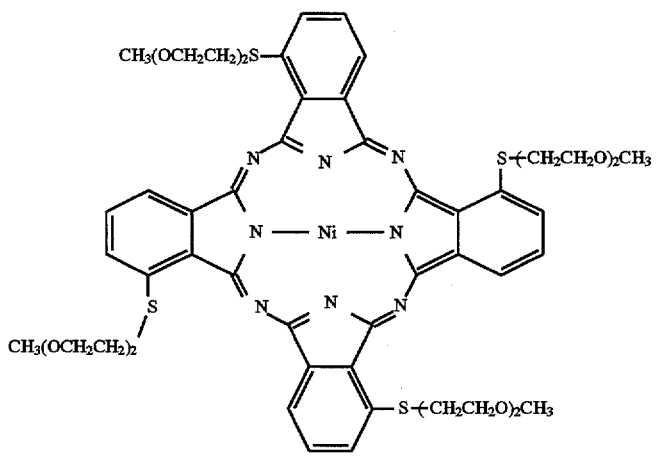

(9)

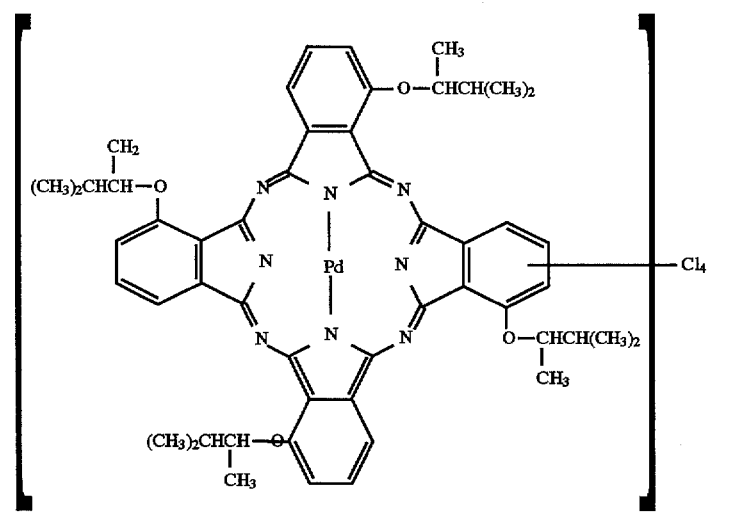

(10)

The phthalocyanine dyes described above may be used in a mixture of two or more kinds thereof, if necessary. Further, there may be mixed other phthalocyanine dyes, other kinds of organic dyes, combustion accelerators, quenchers, UV absorbers, resin binders, and metallocene compounds.

The recording layer used in the present invention can be formed by spin coating or casting a dye solution. In this case, solvents giving no damage to the substrate are preferably selected as the solvent for dissolving the dyes. Given are, for example, aliphatichydrocarbon solvents such as n-hexane, n-octane, and isooctane; cyclic hydrocarbon solvents such as cyclohexane, methylcyclohexane, ethylcyclohexane, propylcyclohexane, dimethylcyclohexane and diethylcyclohexane; halogenated hydrocarbon solvents such as carbon tetrachloride, dichloromethane and 2,2,3,3-tetrafluoro-1-propanol; alcoholic solvents such as methanol, ethanol, 1-propanol, 2-propanol and diacetone alcohol; ether solvents such as diethyl ether, dibutyl ether and diisopropyl ether; and cellosolve solvents such as methyl cellosolve and ethyl cellosolve. These organic solvents may be used either alone or in a mixture of two or more kinds thereof.

The recording layer is formed not only with a single layer but also maltilayers comprising plural dye layers, if necessary.

A reflective layer having a thickness of 50 to 300 nm, preferably 100 to 150 nm is formed on the recording layer. Materials for the reflective layer include those having sufficiently high reflectances against recording and reproduction beams, for example, metals such as Au, Al, Ag, Cu, Ti, Cr, Ni, Pt, Ta, Cr and Pd, or alloys of these metals. Among them, Au, Al and Ag are particularly preferred because of their high reflectivities.

Methods of forming the reflective layer include, for example, sputtering, chemical deposition and vacuum deposition. Further, an intermediate layer may also be provided between the recording layer and the reflective layer for enhancing the reflection and improving the adhesion.

Materials having a large reflectance against recording and reproduction beams are preferred as the materials used for the intermediate layers. The inorganic materials include, for example, $Si_3N_4$, AlN, ZnS, a mixture of ZnS and $SiO_2$, $SiO_2$, $TiO_2$, $CeO_2$ and $Al_2O_3$. These materials may be used alone or in a mixture thereof. The organic materials include known dyes such as cyanine dyes naphthalocyanine dyes, porphyrin dyes and azo dyes, and high molecular compounds such as polystyrenes, polyvinyl acetates, polycarbonates, poly (meth)acrylates, polyvinyl alcohols, polyvinyl butyrals, polyvinyl formals, polyvinylpyrrolidones and polyparahydroxystyrenes.

Further, a protective layer may also be formed on the reflective layer. Materials for the protective layer are not specifically restricted as long as they can protect the reflective layer from an external force. The organic materials include thermoplastic resins, thermosetting resins, and UV-curing resins. Among them, the UV-curing resins are preferred. The inorganic materials include $SiO_2$, $SiN_4$, $MgF_2$ and $SnO_2$.

The optical recording medium thus prepared provides signal characteristics satisfying the Orange Book (CD-R) standards and can be well reproduced by CD players and CD-ROM players which have so far been commercially available.

In the present invention, two or more ROM areas and RAM areas may be provided, and it is allowed to provide the RAM area in a peripheral side and the ROM area in an internal side, and vice vasa.

EXAMPLES

The examples of the present invention shall be shown below, but these are merely some embodiments of the present invention for explaining the art of the present invention, and therefore the technical scope of the present invention should not be restricted to these examples.

Example 1

(Preparation of medium)

Prepared by injection-molding was a discoid polycarbonate substrate [major diameter: 120 mm, thickness: 1.2 mm, reflective index ($n_s$): 1.58] in which there were formed wobbling tracks having a track pitch of 1.6 μm [depth ($d_p$): 300 nm and width ($w_p$): 0.50 μm of pre-pit, depth (D): 100 nm and width (W): 0.25 μm of pre-groove between pre-pits, and wobble amplitude (A): 66 nm] comprising pre-pits and pre-grooves in a ROM area which is the area of 46 to 80 mm in diameter, and wobbling pre-grooves having a track pitch of 1.6 μm [depth ($d_g$): 185 nm, width ($w_g$): 0.45 μm, and wobble amplitude: 33 nm] in a RAM area which is the area of 80 to 118 mm in diameter.

A dye solution was prepared by dissolving 0.25 g of the phthalocyanine dye represented by Formula (2) (dye (I)) in 10 ml of a coating solvent prepared by adding o-xylene of 3% to ethylcyclohexane.

This dye solution was applied on the substrate described above by spin coating at 750 rpm in 5 seconds and then dried for 10 seconds at 3000 rpm to form a recording layer containing the dye. Then, the substrate was dried by heating at 70° C. for 2 hours to remove the residual solvent. The real part of the complex refractive index ($n_d$) of the recording layer (dye-containing layer) thus formed was 2.20. The average thickness of the dye layer was about 100 nm.

Au was sputtered on this dye layer by means of a sputtering apparatus (manufactured by Balzers Co., Ltd.) to form a reflective layer having a thickness of 100 nm, wherein argon gas was used as a sputtering gas. The sputtering conditions were a sputtering power of 2.5 kW and a sputtering gas pressure of $1.0 \times 10^{-2}$ Torr. Further, a UV-curing resin SD-17 (manufactured by Dainippon Ink Chemical Ind. Co., Ltd.) was spin-coated on the reflective layer and then irradiated with UV rays to form a protective layer having a thickness of 6 μm.

(evaluation of medium)

The reflectivity at the groove portion ($I_g$) and the land portion ($I_l$) in the RAM area of the medium were determined by means of an optical disk evaluation apparatus (manufactured by Pulstech Ind. Co., Ltd.) to calculate the RCb from the following equation (3):

$$RCb = 2 \times (I_l - I_g)/(I_l + I_g) \qquad (3)$$

An EFM signal was recorded in the RAM area of the medium by means of a commercial CD-R writer (CDD 521: manufactured by Philips Co., Ltd.). After recording, signals in the ROM area and the RAM area after recording were reproduced by means of a CD player (CD920JT: manufactured by Philips Co., Ltd.) to determine the reflectance (Rtop), the modulation (Ill/Itop) of 11T which is the longest pit. Further the error rate (BLER) and the jitter were determined by means of a CD decoder and a time interval analyzer, respectively. In addition, determined were the WCNRa in the RAM area by inputting a tracking error signal into a spectrum analyzer by means of DDU-1000 described above, and a reading error rate of absolute time (hereinafter abbreviated as ATER) by means of an ATIP decoder.

In order to calculate a difference ($L_p$) between optical path lengths at the pre-pit bottom and the land portion in the ROM area of the medium, a substrate, with a recording layer and an Au sputtered film having a thickness of about 10 nm formed thereon, was used to determine a cavity ($\delta_p$) present on the recording layer at the pre-pit portion by means of a scanning tunneling microscope. Then, the $L_p$ was calculated from the equation (2) described above. The evaluation results thereof are summarized in Table 1.

Examples 2 to 6 and Comparative Examples 1 to 6

Media were prepared and evaluated in the same manners as employed in Example 1, except that used were the substrates having such shapes of the pre-pits in the ROM area and such shapes of the pre-grooves in the RAM area as shown in Table 1. The results thereof are summarized in Table 1.

In Comparative Examples 1, 3, 5 and 6, recording was impossible in the RAM area. The reason why recording was impossible was found that the RCb in the RAM area was too small in Comparative Example 1, so that access to the recording tracks was impossible. Further, in Comparative Examples 3, 5 and 6, the reason was estimated to be that the WCNRa's in the ROM areas were too small, so that the time information in the ROM areas could not be read and time management was impossible.

Example 7

A medium was prepared and evaluated in the same manners as employed in Example 1, except that a solvent prepared by adding o-xylene of 2% to dimethylcyclohexane was used as the coating solvent for a dye.

The results thereof are summarized in Table 1.

Example 8

A medium was prepared and evaluated in the same manners as employed in Example 1, except that a solvent prepared by adding propylcyclohexane of 1% to dimethylcyclohexane was used as the coating solvent for a dye.

The results thereof are summarized in Table 1.

Example 9

A medium was prepared and evaluated in the same manners as employed in Example 1, except that changed were the width to 0.27 µm and the depth to 120 nm of the pre-grooves present in the ROM area and that dimethylcyclohexane was used as the coating solvent for a dye.

The results thereof are summarized in Table 1.

Example 10

A medium was prepared and evaluated in the same manners as employed in Example 6, except that the phthalocyanine dye (II) represented by Formula (3) described above was used.

The results thereof are summarized in Table 1.

Example 11

A medium was prepared and evaluated in the same manners as employed in Example 6, except that the phthalocyanine dye (III) represented by Formula (4) described above was used.

The results thereof are summarized in Table 1.

Example 12

A medium was prepared and evaluated in the same manners as employed in Example 6, except that the phthalocyanine dye (IV) represented by Formula (9) described above was used.

The results thereof are summarized in Table. 1.

Example 13

A medium was prepared and evaluated in the same manners as employed in Example 6, except that the phthalocyanine dye (V) represented by Formula (10) described above was used.

The results thereof are summarized in Table 1.

TABLE 1

| | | ROM area | | | | | | | | | |
|---|---|---|---|---|---|---|---|---|---|---|---|
| | | Pre-pit Depth Width | | Pre-groove Depth Width | | Wobble amplitude | | | Evaluation result | | |
| | Dye | $d_p$ (nm) | $W_p$ (µ) | D (nm) | W (µ) | A (nm) | D × A | $\delta_p$ (nm) | $L_p$ 1/λ | Rtop (%) | I1I/Itop (%) |
| Example 1 | I | 300 | 0.50 | 100 | 0.25 | 66 | 6600 | 200 | 0.33 | 74 | 65 |
| Example 2 | I | 270 | 0.48 | 100 | 0.23 | 33 | 3300 | 190 | 0.32 | 75 | 62 |
| Example 3 | I | 330 | 0.55 | 150 | 0.40 | 33 | 4950 | 220 | 0.36 | 71 | 70 |
| Example 4 | I | 270 | 0.48 | 35 | 0.15 | 99 | 3465 | 190 | 0.32 | 75 | 64 |
| Example 5 | I | 330 | 0.55 | 40 | 0.15 | 99 | 3960 | 220 | 0.36 | 76 | 68 |
| Example 6 | I | 280 | 0.47 | 40 | 0.15 | 99 | 3960 | 195 | 0.32 | 76 | 64 |
| Comp. Example 1 | I | 240 | 0.45 | 100 | 0.25 | 66 | 6600 | 150 | 0.23 | 74 | 56 |
| Comp. Example 2 | I | 300 | 0.50 | 180 | 0.38 | 66 | 11880 | 200 | 0.33 | 55 | 57 |
| Comp. Example 3 | I | 300 | 0.50 | 25 | 0.10 | 110 | 2750 | 200 | 0.33 | 78 | 60 |
| Comp. Example 4 | I | 300 | 0.50 | 100 | 0.25 | 120 | 12000 | 200 | 0.33 | 74 | 65 |
| Comp. Example 5 | I | 300 | 0.50 | 170 | 0.35 | 20 | 3400 | 200 | 0.33 | 60 | 62 |
| Comp. Example 6 | I | 300 | 0.50 | 65 | 0.20 | 45 | 2925 | 200 | 0.33 | 76 | 64 |
| Example 7 | I | 300 | 0.50 | 100 | 0.25 | 66 | 6600 | 210 | 0.35 | 74 | 68 |
| Example 8 | I | 300 | 0.50 | 100 | 0.25 | 66 | 6600 | 180 | 0.27 | 74 | 64 |
| Example 9 | I | 300 | 0.50 | 120 | 0.27 | 66 | 7920 | 225 | 0.40 | 73 | 78 |
| Example 10 | II | 300 | 0.50 | 100 | 0.25 | 66 | 6600 | 210 | 0.35 | 71 | 70 |
| Example 11 | III | 300 | 0.50 | 100 | 0.25 | 66 | 6600 | 210 | 0.35 | 70 | 68 |
| Example 12 | IV | 300 | 0.50 | 100 | 0.25 | 66 | 6600 | 210 | 0.34 | 71 | 67 |
| Example 13 | V | 300 | 0.50 | 100 | 0.25 | 66 | 6600 | 210 | 0.33 | 72 | 70 |

| | ROM area | | | | RAM area | | | | | |
|---|---|---|---|---|---|---|---|---|---|---|
| | Evaluation result | | | | Pre-groove Depth Width | | | Evaluation result | | |
| | BLER (c/s) | Jitter (ns) | WCNRa (dB) | ATER (%) | d (nm) | $W_g$ (µ) | RCb | Rtop (%) | I1I/Itop (%) | BLER (c/s) |
| Example 1 | <5 | 28 | 33 | 0 | 185 | 0.45 | 0.10 | 70 | 67 | <5 |
| Example 2 | <5 | 28 | 27 | 0 | 185 | 0.45 | 0.10 | 70 | 67 | <5 |
| Example 3 | <5 | 27 | 31 | 0 | 200 | 0.50 | 0.12 | 67 | 70 | <5 |
| Example 4 | <5 | 27 | 28 | 0 | 185 | 0.45 | 0.10 | 70 | 67 | <5 |
| Example 5 | <5 | 30 | 29 | 0 | 200 | 0.50 | 0.12 | 67 | 70 | <5 |
| Example 6 | <5 | 30 | 29 | 0 | 195 | 0.46 | 0.09 | 72 | 66 | <5 |

TABLE 1-continued

| | | | | | | | | | | |
|---|---|---|---|---|---|---|---|---|---|---|
| Comp. Example 1 | 3400 | 37 | 30 | 0 | 120 | 0.30 | 0.02 | No record possible | | |
| Comp. Example 2 | 5780 | 38 | 34 | 0 | 260 | 0.45 | 0.20 | 52 | 75 | 6780 |
| Comp. Example 3 | <5 | 39 | 23 | 90 | 185 | 0.45 | 0.10 | No record possible | | |
| Comp. Example 4 | 1320 | 40 | 33 | 0 | 185 | 0.45 | 0.10 | 70 | 67 | <5 |
| Comp. Example 5 | <5 | 38 | 20 | 100 | 185 | 0.45 | 0.10 | No record possible | | |
| Comp. Example 6 | <5 | 34 | 22 | 100 | 185 | 0.45 | 0.10 | No record possible | | |
| Example 7 | <5 | 25 | 30 | 0 | 185 | 0.45 | 0.12 | 69 | 70 | <5 |
| Example 8 | <5 | 29 | 30 | 0 | 185 | 0.45 | 0.08 | 73 | 68 | <5 |
| Example 9 | <5 | 23 | 30 | 0 | 185 | 0.45 | 0.15 | 66 | 68 | <5 |
| Example 10 | <5 | 25 | 30 | 0 | 185 | 0.45 | 0.12 | 68 | 67 | <5 |
| Example 11 | <5 | 27 | 31 | 0 | 185 | 0.45 | 0.10 | 66 | 66 | <5 |
| Example 12 | <5 | 28 | 30 | 0 | 185 | 0.45 | 0.14 | 65 | 68 | <5 |
| Example 13 | <5 | 26 | 31 | 0 | 185 | 0.45 | 0.11 | 69 | 66 | <5 |

As described above, the present invention can provide a hybrid disk having such good signal characteristics as satisfying the Orange Book standards by:

(1) making the depth of the pre-pits in the ROM area into 250 nm or more and 350 nm or less, the depth of the pre-grooves between the above pre-pits into 30 nm or more and 170 nm or less, the wobble amplitude into 25 nm or more and 110 nm or less, and the product of the depth of the pre-groove present between two adjacent pre-pits and the wobble amplitude into 3100 or more, and (2) making the depth of the pre-grooves in the RAM area into 130 nm or more and 250 nm or less.

What is claimed is:

1. A hybrid optical recording medium comprising a recording layer containing a dye, a reflective layer and a protective layer each provided in this order on a substrate comprising a read-only (ROM) area in which pre-pits are formed and a recordable (RAM) area in which pre-grooves are formed, wherein:

(1) the ROM area has the pre-pits and pre-grooves connecting each adjacent pre-pit, and said pre-pits and pre-grooves form wobbling tracks, wherein said pre-pits have a depth of 250 nm or more and 350 nm or less; said pre-grooves have a depth of 30 nm or more and 170 nm or less; the tracks have a wobble amplitude of 25 nm or more and 110 nm or less; and the product of the depth of said pre-grooves and said wobble amplitude is 3100 or more, and (2) the RAM area has the pre-grooves of a depth of 130 nm or more and 250 nm or less.

2. An optical recording medium as described in claim 1, wherein the dye used for the recording layer comprises a phthalocyanine dye represented by the following Formula (1):

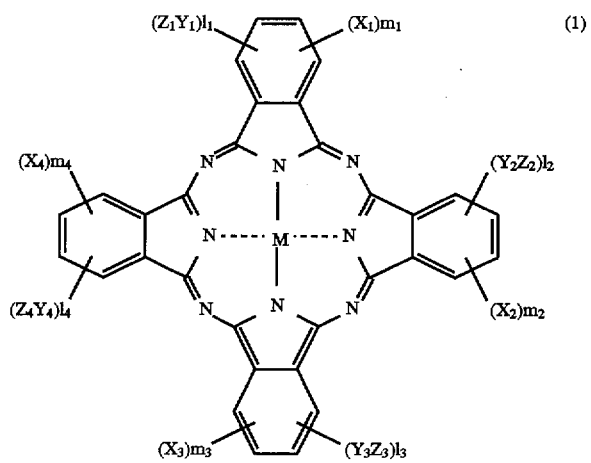

wherein M represents two hydrogen atoms, or metal, metal oxide or metal halide; $Y_1$, $Y_2$, $Y_3$ and $Y_4$ each represent an oxygen atom or a sulfur atom; $Z_1$, $Z_2$, $Z_3$ and $Z_4$ each represent an unsubstituted or substituted hydrocarbon group having 4 to 12 carbon atoms; $X_1$, $X_2$, $X_3$ and $X_4$ each represent a halogen atom; $l_1$, $l_2$, $l_3$ and $l_4$ each represent 1 or 2; and $m_1$, $m_2$, $m_3$ and $m_4$ each represent an integer of 0 to 3.

3. An optical recording medium as described in claim 1, wherein the pre-pits in said ROM area have a depth of 270 nm or more and 340 nm or less; said pre-grooves have a depth of 35 nm or more and 150 nm or less; the tracks have a wobble amplitude of 28 nm or more and 99 nm or less; and the product of the depth of the pre-grooves and the wobble amplitude is 3300 or more.

4. An optical recording medium as described in claim 2, wherein the pre-pits in said ROM area have a depth of 270 nm or more and 340 nm or less; said pre-grooves have a depth of 35 nm or more and 150 nm or less; the tracks have a wobble amplitude of 28 nm or more and 99 nm or less; and the product of the depth of the pre-grooves and the wobble amplitude is 3300 or more.

5. An optical recording medium as described in claim 1, wherein the pre-grooves in said RAM area have a depth of 150 nm or more and 230 nm or less.

6. An optical recording medium as described in claim 2, wherein the pre-grooves in said RAM area have a depth of 150 nm or more and 230 nm or less.

7. An optical recording medium as described in claim 3, wherein the pre-grooves in said RAM area have a depth of 150 nm or more and 230 nm or less.

8. An optical recording medium as described in claim 4, wherein the pre-grooves in said RAM area have a depth of 150 nm or more and 230 nm or less.

9. An optical recording medium as described in claim 1, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

10. An optical recording medium as described in claim 2, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

11. An optical recording medium as described in claim 3, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

12. An optical recording medium as described in claim 4, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

13. An optical recording medium as described in claim 5, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

14. An optical recording medium as described in claim 6, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

15. An optical recording medium as described in claim 7, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

16. An optical recording medium as described in claim 8, wherein a difference between optical path lengths at a pre-pit portion and a land present between two tracks comprising the pre-pits and the pre-grooves in said ROM area is 0.26 λ (wherein λ is the wavelength of a laser beam for reproduction) or more and 0.40 λ or less.

* * * * *